US010402857B2

(12) United States Patent
Aihara

(10) Patent No.: US 10,402,857 B2
(45) Date of Patent: Sep. 3, 2019

(54) INFORMATION DISTRIBUTION SYSTEM, INFORMATION DISTRIBUTION APPARATUS, AND INFORMATION DISTRIBUTION METHOD

(71) Applicant: RICOH COMPANY, LTD., Tokyo (JP)

(72) Inventor: Shoji Aihara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 865 days.

(21) Appl. No.: 14/959,045

(22) Filed: Dec. 4, 2015

(65) Prior Publication Data
US 2016/0180385 A1    Jun. 23, 2016

(30) Foreign Application Priority Data

Dec. 18, 2014  (JP) .................................. 2014-255728
Nov. 30, 2015  (JP) .................................. 2015-233684

(51) Int. Cl.
*G06Q 30/02* (2012.01)
*H04L 29/08* (2006.01)

(52) U.S. Cl.
CPC ......... *G06Q 30/0255* (2013.01); *H04L 67/22* (2013.01)

(58) Field of Classification Search
CPC ....................................................... G06Q 30/02
See application file for complete search history.

(56) References Cited

U.S. PATENT DOCUMENTS

| 2010/0088178 A1* | 4/2010 | Gnanasambandam ..................... G06Q 30/02 705/14.49 |
| 2012/0191529 A1* | 7/2012 | Lewis .................... G06Q 30/02 705/14.41 |
| 2015/0235270 A1* | 8/2015 | Partida ............... G06Q 30/0267 705/14.64 |

FOREIGN PATENT DOCUMENTS

| JP | 2010-219700 | 9/2010 |
| JP | 2012-161023 | 8/2012 |
| JP | 5184269 | 4/2013 |
| WO | 2010/029936 A1 | 3/2010 |

* cited by examiner

*Primary Examiner* — Patricia H Munson
(74) *Attorney, Agent, or Firm* — Oblon, McClelland, Maier & Neustadt, L.L.P.

(57) ABSTRACT

An information distribution system includes an electronic device and an information distribution apparatus which are connected via a network. The electronic device includes a display unit that displays a primary advertisement information, stored beforehand in the electronic device, on the electronic device in response to a user operation. An advertisement viewing history management unit stores into a device information storage unit of the information distribution apparatus an advertisement viewing history information including identification information for identifying the displayed primary advertisement information, and display date information. The information distribution apparatus includes an advertisement viewing history collection unit that collects the advertisement viewing history information from the (Continued)

electronic device. A distribution information generation unit generates a secondary advertisement distribution information based on the advertisement viewing history information. A distribution unit distributes the secondary advertisement distribution information to the electronic device.

12 Claims, 13 Drawing Sheets

FIG.8

CONTRACT INFORMATION STORAGE UNIT — 31b

DEVICE CONTRACT INFORMATION

| |
|---|
| DEVICE ID: 1003 |
| MAINTENANCE CONTRACT: CONTRACTED |
| CONSUMABLES ORDERING OPTION: CONTRACTED |
| USE SITUATION REPORT OPTION: CONTRACTED |
| AUTOMATIC COUNTER READING: CONTRACTED |
| ⋮ |

USER CONTRACT INFORMATION

| CUSTOMER ID: A200005 | |
|---|---|
| DEVICE ID: 1003 | MODEL-A |
| DEVICE ID: 1012 | MODEL-B |
| DEVICE ID: 1020 | MODEL-C |
| DEVICE ID: 1051 | MODEL-D |
| ⋮ | |

CONTENT-DISTRIBUTE-CONDITION LIST STORAGE UNIT — 31c

CONTENT-DISTRIBUTE-CONDITION LIST

| (CONTENT DISTRIBUTE CONDITION) | ··· |
|---|---|

| NO-NEEDLE STAPLE ADVERTISEMENT PARAMETER | THRESHOLD |
|---|---|
| ADVERTISEMENT VIEWING RATIO (VIEWERS/ALL USERS) | 50% |
| NO. OF STAPLE USE JOBS | N TIMES/MONTH |
| AVERAGE NO. OF STAPLED SHEETS | 5 |

| SECONDARY ADVERTISEMENT PATTERN DATA |
|---|

FUNCTION AVAILABILITY LIST

| TARGET UNIT | MODEL-A | MODEL-B | MODEL-C | COMMON FUNCTION PROPRIETY |
|---|---|---|---|---|
| NO-NEEDLE STAPLE UNIT | ○ | ○ | × | × |
| BOOKBINDING UNIT | ○ | × | × | ○ |
| IC CARD AUTHENTICATION UNIT | ○ | ○ | ○ | × |

CONTENT STORAGE UNIT — 31d

| CONTENT | | |
|---|---|---|
| (DEVICE ID) | (DEVICE ID) | ··· |
| ⋮ | | |

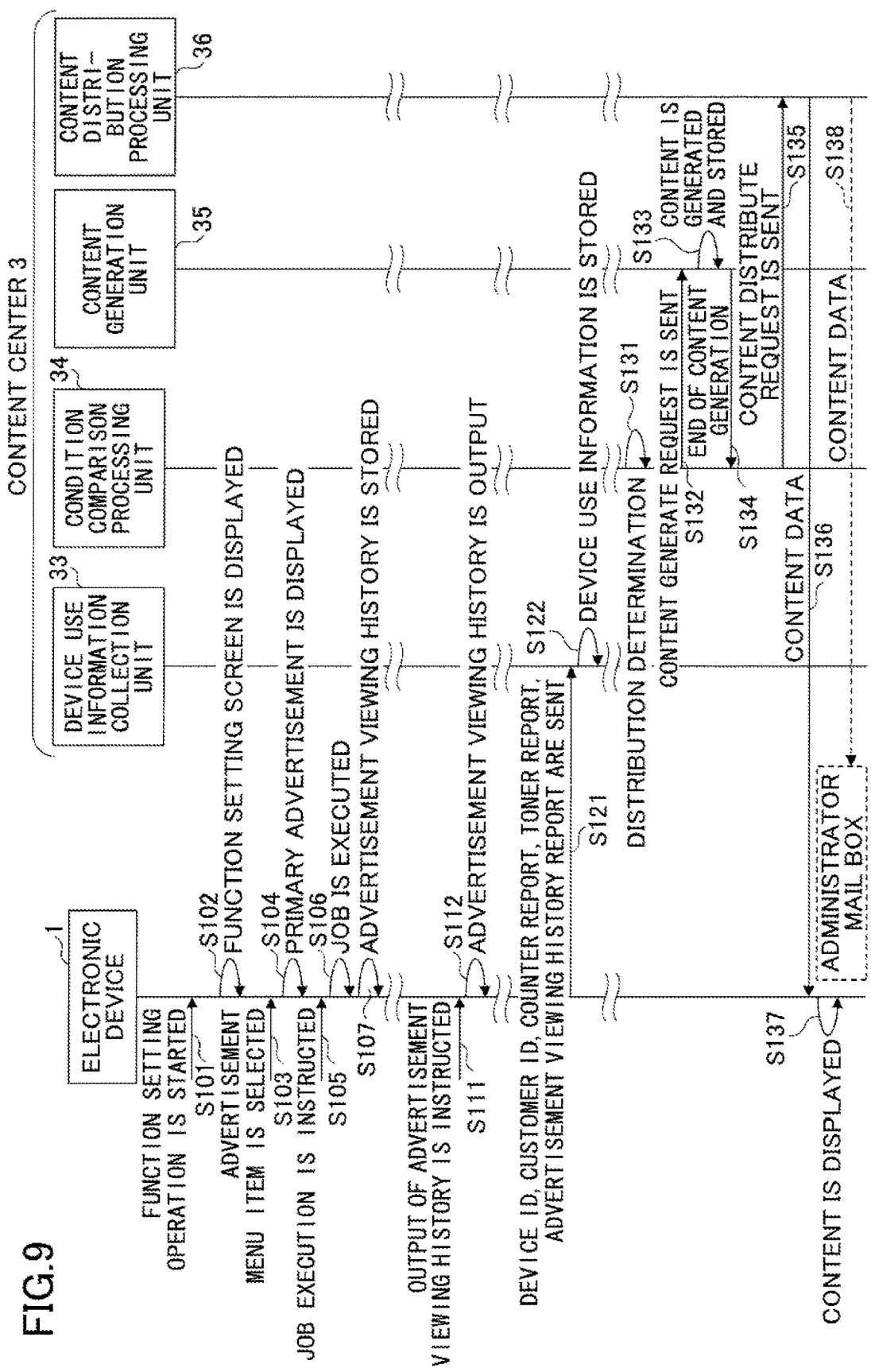

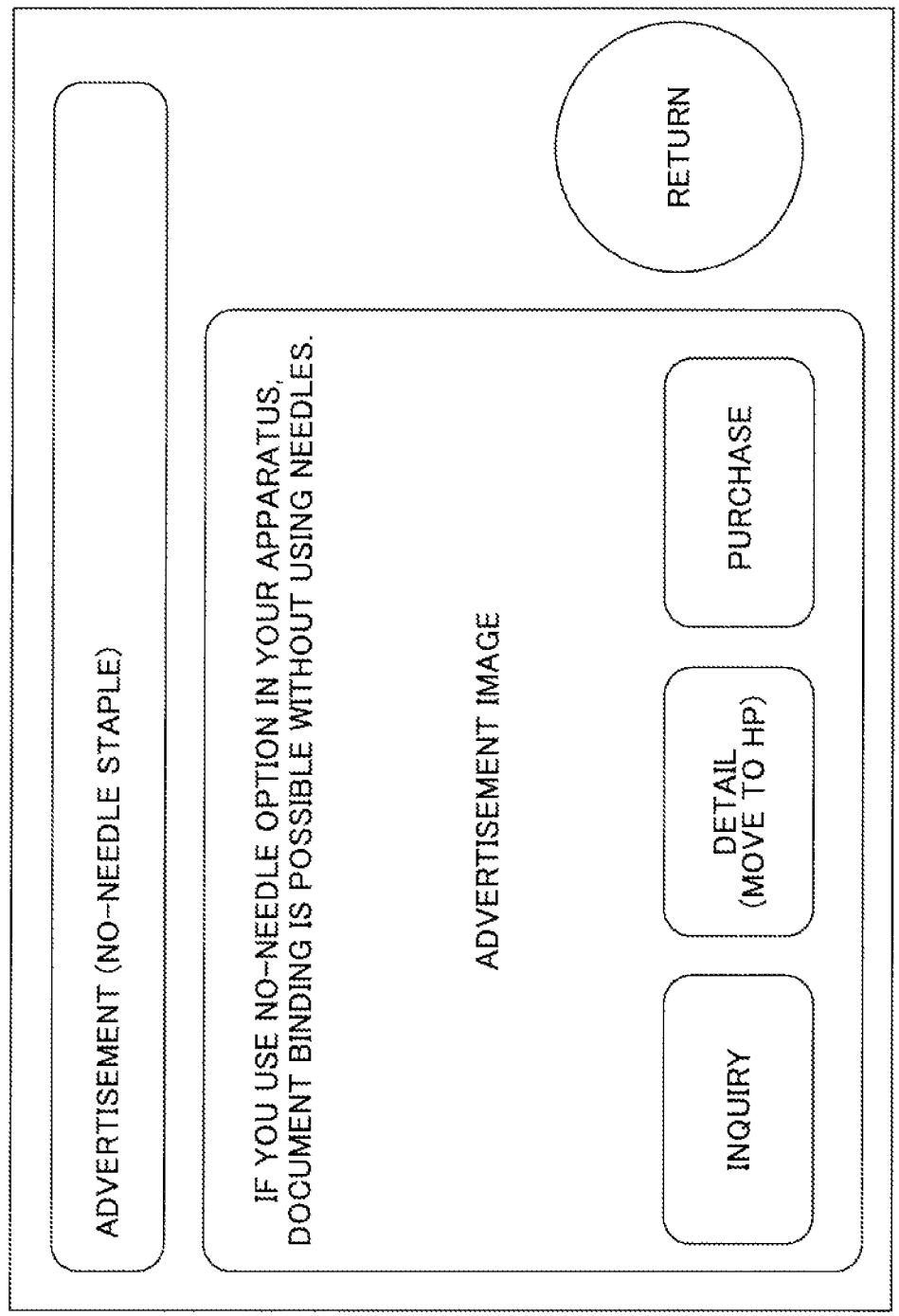

FIG.12A

ADVERTISEMENT VIEWING HISTORY (PER USER)

| USER | ACCESS DATE | ADVERTISEMENT TYPE | JOB HISTORY |
|---|---|---|---|
| USER-A | 20XX/XX/XX | NO-NEEDLE STAPLE | COPY/DUPLEX/STAPLE/ ... |
| USER-A | 20XX/XX/XX | IC CARD AUTHENTICATION | SCANNER/PDF/ ... |
| USER-B | 20XX/XX/XX | RING BINDING | COPY/DUPLEX/STAPLE/ ... |
| USER-C | 20XX/XX/XX | FAX SYSTEM ASSOCIATION | FAX/DESIGNATED TIME/ ... |

FIG.12B

ADVERTISEMENT VIEWING HISTORY (PER ADVERTISEMENT)

| ADVERTISEMENT TYPE | FREQUENCY | ACCESS USER | TIMES | ACCESS DATE |
|---|---|---|---|---|
| NO-NEEDLE STAPLE | 10 | USER-A | 2 | 20XX/XX/XX, ... |
|  |  | USER-B | 1 | 20XX/XX/XX |
|  |  | USER-D | 1 | 20XX/XX/XX |
|  |  | ... |  |  |
| IC CARD AUTHENTICATION | 15 | USER-C | 1 | 20XX/XX/XX |
|  |  | USER-E | 1 | 20XX/XX/XX |
|  |  | ... |  |  |

WE ARE CURRENTLY OFFERING A SPECIAL
PURCHASE PLAN.
PLEASE DO NOT MISS THIS OPPORTUNITY
IF YOU NEED AN OPTION UNIT.
THE FOLLOWING PRODUCTS ARE AVAILABLE
AT A SPECIAL PRICE.

(DETAILS OF UNITS, PURCHASE CONDITIONS, ETC.)

INFORMATION DISTRIBUTION SYSTEM, INFORMATION DISTRIBUTION APPARATUS, AND INFORMATION DISTRIBUTION METHOD

CROSS-REFERENCE TO RELATED APPLICATION

The present application is based upon and claims the benefit of priority of Japanese Patent Application No. 2014-255728, filed on Dec. 18, 2014, and Japanese Patent Application No. 2015-233684, filed on Nov. 30, 2015, the contents of which are incorporated herein by reference in their entirety.

BACKGROUND OF THE INVENTION

1. Field of the Invention

The present invention relates to an electronic device, an information distribution apparatus, an information distribution system, an information distribution method, and an information distribution program.

2. Description of the Related Art

Currently, a signage system which displays an image including various kinds of information by a display unit, a projector, etc. is used increasingly widely. In particular, it is known that utilizing a signage system to distribute and display advertisements or announcements is effective.

Also in a case of a computer-integrated electronic device, such as an image forming apparatus, the utilization of a signage system not only for providing fundamental functions but also for providing a user with a certain type of information is proposed. For example, there is proposed an image forming apparatus which is adapted to display use situations of inexpensive printing modes, such as a duplex mode and an aggregate mode, for every user at a time of login in order to promote cost saving to visitors. See Japanese Laid-Open Patent Publication No. 2012-161023.

When providing content, such as an advertisement, to an electronic device, it is requested that the content is useful for a user and an effect of the content appropriate for the provider side can be obtained.

However, according to the related art, the content generated according to the provider's own standard is merely displayed on the electronic device. There is a problem that the content which some users do not want to vie is provided to the electronic device against the viewer's will.

Moreover, the effect of the content is completed when the content is displayed on the electronic device. There is no contribution to generation of content aimed at a higher effect.

SUMMARY OF THE INVENTION

In one aspect, the present invention provides an information distribution system which is capable of acquiring information which contributes to generation of content aimed at a higher effect without causing a burden to a user.

In one embodiment, the present invention provides an information distribution system including an electronic device and an information distribution apparatus which are connected via a network, wherein the electronic device includes a first processor, the first processor including: a display unit configured to display a primary advertisement information, stored beforehand in the electronic device, on the electronic device in response to a user operation; and an advertisement viewing history management unit configured to store, into a device information storage unit of the information distribution apparatus, an advertisement viewing history information including identification information for identifying the displayed primary advertisement information, and display date information associated with the identification information, and the information distribution apparatus includes a second processor, the second processor including: an advertisement viewing history collection unit configured to collect the advertisement viewing history information from the electronic device; a distribution information generation unit configured to generate a secondary advertisement distribution information based on the advertisement viewing history information; and a distribution unit configured to distribute the secondary advertisement distribution information to the electronic device.

The object and advantages of the invention will be implemented and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 is a diagram showing an example of a data structure of contract information, a content-distribute-condition list, and content.

FIG. 9 is a sequence diagram for explaining a process performed by an information distribution system according to an embodiment.

FIG. 11 is a diagram showing an example of a primary advertisement screen.

FIG. 12A and FIG. 12B are diagrams showing examples of an advertisement viewing history.

FIG. 13 is a diagram showing an example of a secondary advertisement screen.

DETAILED DESCRIPTION OF THE PREFERRED EMBODIMENTS

A description will be given of embodiments with reference to the accompanying drawings.

In the following embodiments, a case in which a content distribution mechanism for signage display is used for the purpose of distributing information is assumed. Alternatively, a dedicated mechanism for distributing information may be constructed regardless of signage display.

Figure 1:
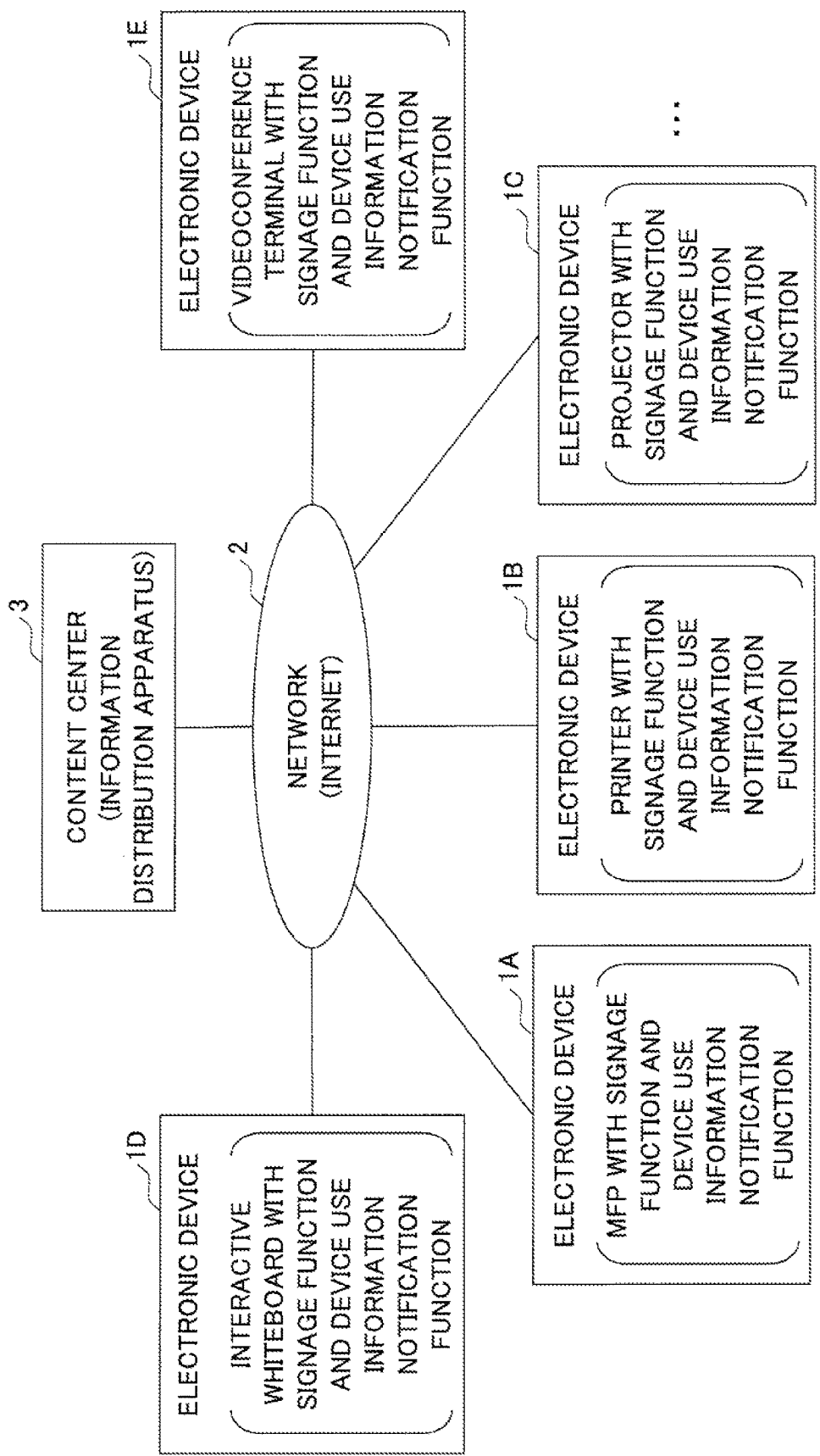
FIG. 1 is a diagram showing an example of an information distribution system according to an embodiment.

FIG. 1 shows an example of an information distribution system according to an embodiment. As shown in FIG. 1, a content center 3 (which may be an information distribution apparatus or a server device) stores the content of information to be distributed in a concentrated manner, and the content data are distributed to a plurality of electronic devices 1A, 1B, 1C, 1D, 1E, . . . via a network 2, such as the Internet. Any one of these electronic devices may be in an offline state in which such an electronic device is not connected to the network 2. In this case, the information from each electronic device is collected by the content center 3 instead of the off-line device and the content data are transmitted from the content center 3 to a predetermined user by e-mail or the like. Note that the content displayed on an electronic device includes the content of a primary advertisement stored beforehand in the electronic device and the content of a secondary advertisement generated on the side of the content center 3.

In the following, any one of the plurality of electronic devices 1A, 1B, 1C, 1D, 1E . . . may be called an electronic device 1.

The plurality of electronic devices 1A, 1B, 1C, 1D, 1E, . . . include a multi-function peripheral (MFP), a printer, a projector, an interactive whiteboard, a videoconference terminal, etc., each having a signage function and a device use information notification function. Namely, each of the plurality of electronic devices has a function to display the content thereon and a function to notify its device use information. Each of the electronic devices 1A, 1B, 1C, 1D, 1E . . . has a unique device ID (identification information). The content center 3 periodically collects the device use information associated with each device ID and uses the device use information for remote maintenance management of the electronic devices. The content center 3 is configured to distribute different content data to the electronic devices having the respective device IDs via the network 2.

Note that the device use information is information indicating how the electronic device 1 was used. Hence, the device use information varies depending on how the electronic device 1 is used. Specifically, the device use information includes the number of copied sheets. The details of the device use information will be described below.

Figure 2:
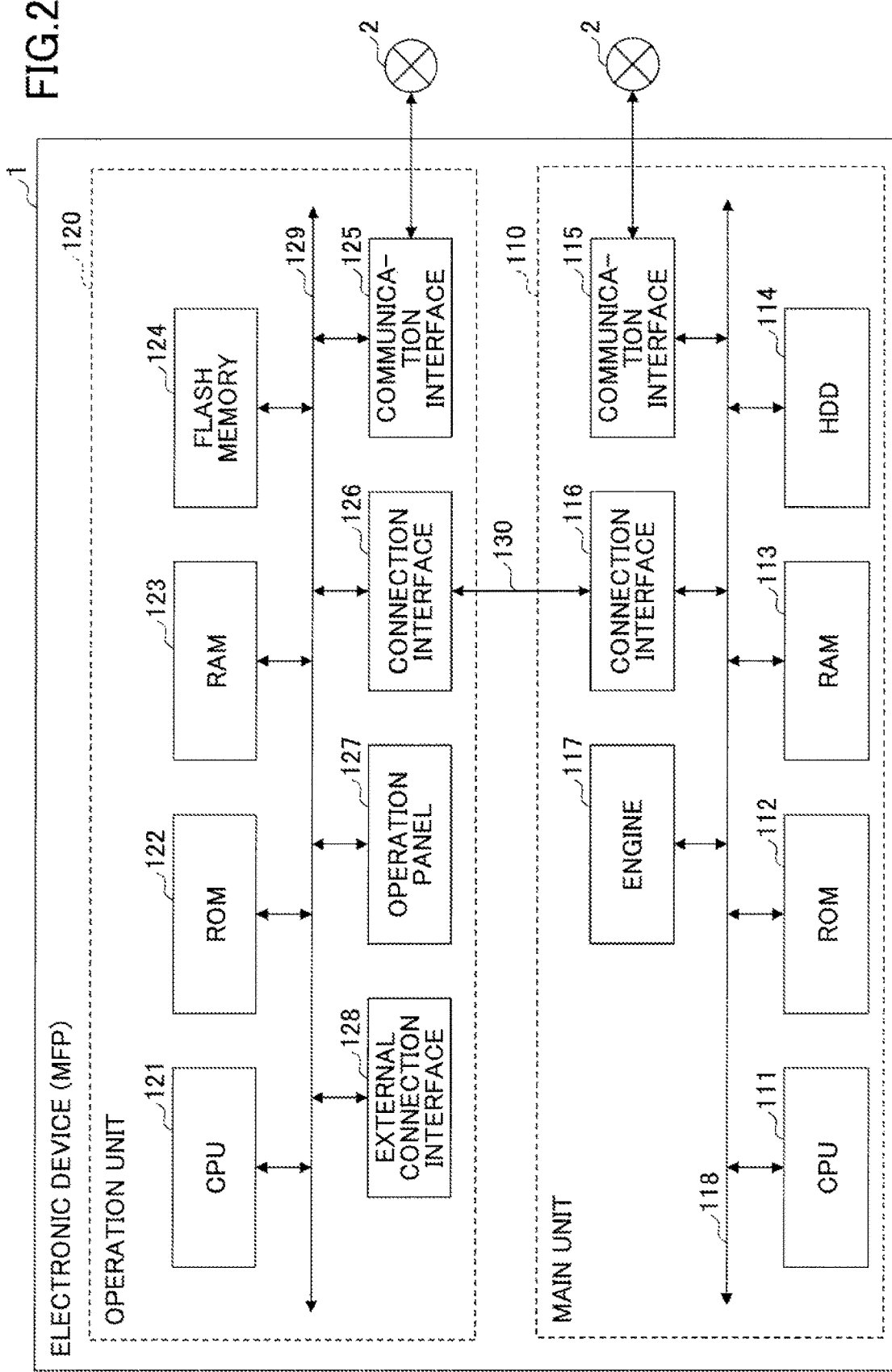
FIG. 2 is a diagram showing a hardware configuration of an electronic device in the information distribution system.

FIG. 2 shows a hardware configuration of the electronic device 1. In FIG. 2, a case in which the electronic device 1 is an MFP is assumed. As shown in FIG. 2, the electronic device 1 includes a main unit 110 in which a plurality of image forming functions, including a copy function, a scanner function, a fax function, and a printer function are implemented, and an operation unit 120 configured to receive a user operation. Note that receiving a user operation may include receiving information (which includes signals indicating coordinate values of a point on a screen) which is input by the user operation. The main unit 110 and the operation unit 120 are connected via a dedicated transmission line 130, so that the main unit 110 and the operation unit 120 may communicate with each other. For example, the transmission line 130 may be a cable in conformity with the universal serial bus (USB) standards. Alternatively, the transmission line 130 may be in conformity with any wired or wireless communication standards. The main unit 110 is configured to perform operations in response to the user operation received by the operation unit 120. The main unit 110 is configured to communicate with an external device, such as a client PC (personal computer), and perform a process according to an instruction received from the external device.

The main unit 110 includes a central processing unit (CPU) 111, a read-only memory (ROM) 112, a random access memory (RAM) 113, a hard disk drive (the HDD) 114, a communication interface 115, a connection interface 116, and an engine unit 117. These elements of the main unit 110 are interconnected by a system bus 118.

The CPU 111 is configured to control overall operations of the main unit 110. The CPU 111 is configured to execute a program read from the ROM 112 or the HDD 114 to the RAM 113 by using the RAM 113 as a work area, so that the plurality of image forming functions of the main unit 110, including a copy function, a scanner function, a fax function, and a printer function, are implemented. The communication interface 115 is an interface for connecting the main unit 110 with the network 2. The connection interface 116 is an interface of the main unit 110 for communicating with the operation unit 120 via the transmission line 130. The engine unit 117 is a hardware element which performs processes, other than the general-purpose information processing and communication processing, to implement the copy function, the scanner function, the fax function, and the printer function. For example, the engine unit 117 may include a scanner (image reading unit) which scans a document and reads an image of the document, a plotter (image formation unit) which performs printing of a sheet material such as a paper, and a fax unit which performs facsimile communications. Further, the engine unit 117 may include specific option units, such as a finisher for handling printed sheet materials, and an automatic document feeder (ADF) for performing automatic feeding of documents.

The operation unit 120 includes a CPU 121, a ROM 122, a RAM 123, a flash memory 124, a communication interface 125, a connection interface 126, an operation panel 127, and an external connection interface 128. These elements of the operation unit 120 are interconnected by a system bus 129. The CPU 121 is configured to control overall operations of the operation unit 120. The CPU 121 executes a program read from the ROM 122 or the flash memory 124 into the RAM 123 using the RAM 123 as a work area to control the overall operations of the operation unit 120 and implement various functions, such as a display function to display information (image) in response to a user's input operation. The communication interface 125 is an interface for connecting the operation unit 120 with the network 2. The connection interface 126 is an interface of the operation unit 120 for communicating with the main unit 110 via the transmission line 130. The operation panel 127 is configured to receive various inputs according to a user operation, and display various kinds of information (including information according to the received operation, information indicating an operational situation of the electronic device 1, and information indicating the setting condition). In this embodiment, it is assumed that the operation panel 127 is a liquid crystal display (LCD) device having a touch-panel function. However, the present invention is not limited to this embodiment. Alternatively, an organic electro-luminescence (EL) display device having a touch-panel function may be used as the operation panel 127. Further, the operation panel 127 may include an operation portion having hard keys and an indicator portion having lamps. The external connection interface 128 is an interface for connecting the operation unit 120 with an external device, such as an IC card reader.

Figure 3:
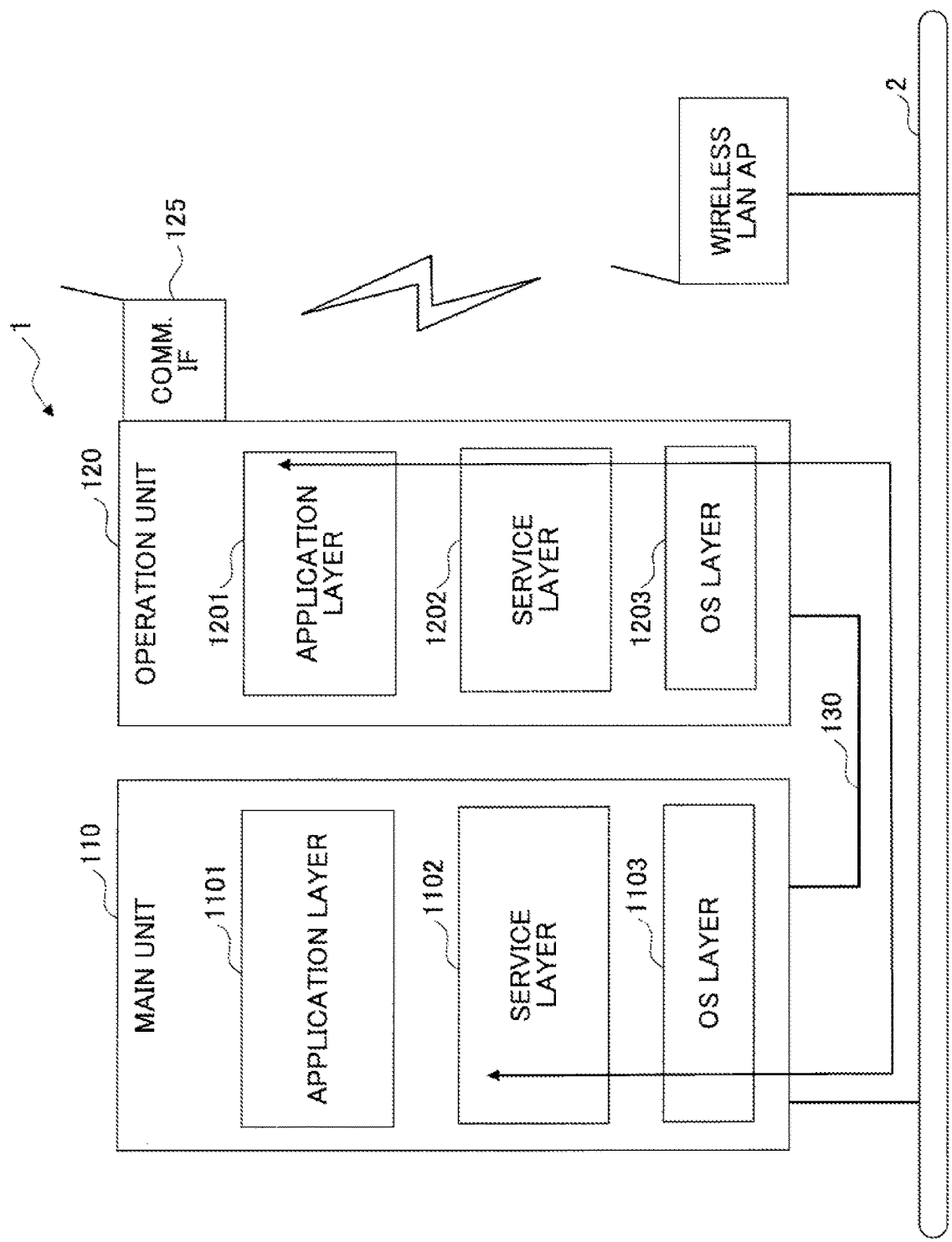
FIG. 3 is a diagram showing a software hierarchical structure of the electronic device.

FIG. 3 shows an example of a software hierarchical structure of the electronic device 1. In FIG. 3, a case in which the electronic device 1 is an MFP is assumed. As shown in FIG. 3, the main unit 110 includes an application layer 1101, a service layer 1102, and an OS layer 1103. The substance of the application layer 1101, the service layer 1102, and the OS layer 1103 is various software components stored in the ROM 112 or the HDD 114 shown in FIG. 2.

Such software components when executed by the CPU 111 cause the CPU 111 to carry out the above-described functions.

The software of the application layer 1101 includes an application program (which may also be called an application) for operating hardware resources to implement a predetermined function. For example, a copy application for implementing the copy function, a scanner application for implementing the scanner function, a fax application for implementing the fax function, and a printer application for implementing the printer function may be included in the application layer 1101.

The software of the service layer 1102 includes a software component interposed between the application layer 1101 and the OS layer 1103 for providing an application program with an interface for utilizing the hardware resources of the main unit 110. Specifically, the software component is configured to implement the functions to perform reception of operational requests to the hardware resources and arbitration of the operational requests. The operational requests received by the service layer 1102 include a reading request to the scanner, and a printing request to the plotter. Note that the service layer 1102 provides the interface not only to the application layer 1101 of the main unit 110 but also to the application layer 1201 of the operation unit 120. Namely, the application of the application layer 1201 of the operation unit 120 may carry out the function to utilize the hardware resources (e.g., the engine unit 117) of the main unit 110 through the interface provided by the service layer 1102.

The software of the OS layer 1103 includes an operating system (OS) for offering the basic functions to control the hardware resources of the main unit 110. The software component of the service layer 1102 converts a request for utilizing the hardware resources received from the application program into a command which can be interpreted by the OS layer 1103, and transfers the command to the OS layer 1103. The hardware resources carry out the operation in response to the request from the application program by the execution of the command by the software of the OS layer 1103.

Similarly, the operation unit 120 includes an application layer 1201, a service layer 1202, and an OS layer 1203. A hierarchical structure of the application layer 1201, the service layer 1202 and the OS layer 1203 included in the operation unit 120 is essentially the same as that of the application layer 1101, the service layer 1102 and the OS layer 1103 included in the main unit 110. However, the function offered by the application of the application layer 1201 and the operational request which can be received by the service layer 1202 differ from those of the main unit 110. The application of the application layer 1201 may be an application program for operating the hardware resources of the operation unit 120 to implement a predetermined function. However, the application of the application layer 1201 is primarily a software component for providing a user interface (UI) function for performing the operation and the display related to the image forming functions of the main unit 110 (including the copy function, the scanner function, the fax function, and the printer function).

In the software configuration shown in FIG. 3, in order to maintain the independency of functions, the software of the OS layer 1103 of the main unit 110 differs from the software of the OS layer 1203 of the operation unit 120. Namely, the main unit 110 and the operation unit 120 are operated by different operating systems independently. For example, Android® may be used as the software of the OS layer 1203 of the operation unit 120, and Linux® may be used as the software of the OS layer 1103 of the main unit 110.

Because the main unit 110 and the operation unit 120 are operated by different operating systems, the communication between the main unit 110 and the operation unit 120 is performed as the device-to-device communication between different devices, not as the inter-process communication within a single device. The communication for transmitting information (an instruction from a user) received by the operation unit 120 to the main unit 110 (command communication), and the communication for sending a notification of an event from the main unit 110 to the operation unit 120 correspond to the above-described communication. In this embodiment, the operation unit 120 is capable of utilizing the function of the main unit 110 by sending a command to the main unit 110 through the command communication. The events reported to the operation unit 120 by the main unit 110 include the situation of the operation executed by the main unit 110 and the content of the setting by the main unit 110. Further, the power supply to the operation unit 120 is performed via the transmission line 130 from the main unit 110, and the power control of the operation unit 120 and the power control of the main unit 110 may be performed independently of each other.

Figure 4:
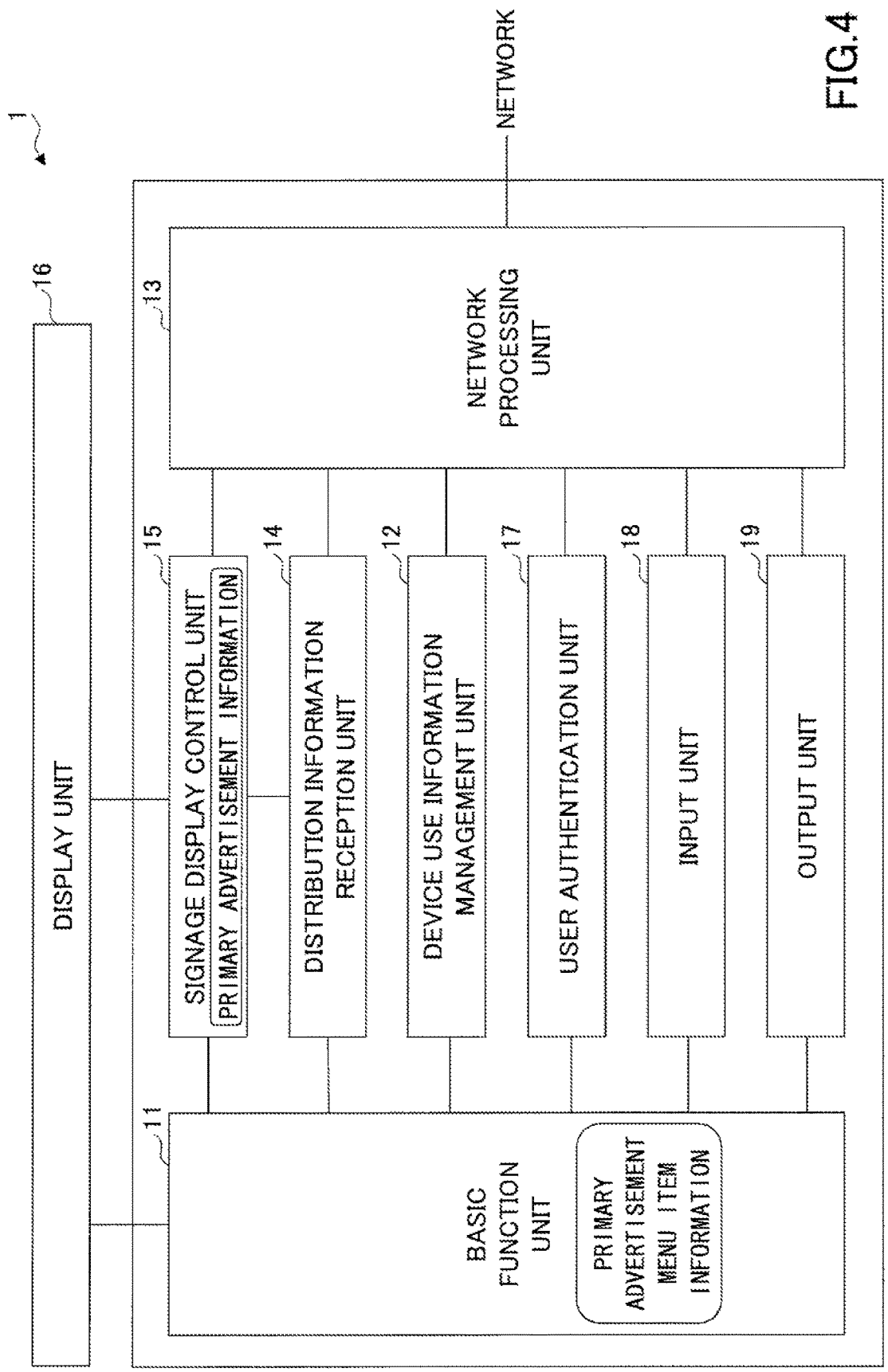
FIG. 4 is a diagram showing a software configuration of the electronic device.

FIG. 4 shows an example of a software configuration of the electronic device 1. As shown in FIG. 4, the electronic device 1 includes a basic function unit 11, a device use information management unit 12, a network processing unit 13, a distribution information reception unit 14, a signage display control unit 15, a display unit 16, a user authentication processing unit 17, an input unit 18, and an output unit 19.

In the electronic device 1, the basic function unit 11, the device use information management unit 12, the network processing unit 13, the distribution information reception unit 14, the signage display control unit 15, the user authentication processing unit 17, the input unit 18, and the output unit 19 represent functions and units implemented by any of the elements and devices shown in FIG. 2, which are activated by instructions from the CPU 111 based on the program read into the RAM 113 from the ROM 112 or the HDD 114. The display unit 16 is implemented by the operation unit 120 shown in FIG. 2.

The program may be recorded in an installable format or in an executable format on a computer-readable recording medium such as a compact disc (CD), a digital versatile disk (DVD), an SD memory card, a USB memory, and a ROM. Alternatively, the program may be provided or distributed via a network, such as the Internet.

However, the present invention is not limited to this embodiment. For example, all or a part of the functions of the electronic device 1 may be implemented by dedicated hardware circuits.

The basic function unit 11, the user authentication processing unit 17, the input unit 18, and the output unit 19 are major units of the electronic device 1 which are configured to implement the major function thereof. For example, these units are configured to implement the major function of an MFP, a printer, a projector, an interactive whiteboard, or a videoconference terminal. The user authentication processing unit 17 is configured to authenticate a user who performs a login operation upon starting the electronic device 1. When the user is successfully authenticated, the use of the electronic device 1 by the authenticated user is permitted. When the authentication is failed, the use of the electronic device 1 by the user is restricted (access control). The input unit 18 is configured to receive an input document image (scanner input), etc. The output unit 19 is configured to perform a printout or data output to a memory card, etc.

The basic function unit 11 is configured to store primary advertisement menu item information for incorporating a menu item to prompt a user to select displaying of a primary advertisement into menu items of a function setting screen displayed during an operation of a basic function (which is, in the case of the MFP, a copy setting, etc.). The primary advertisement menu item information is stored at a time of installation or updating (including remote updating) of a program of the basic function unit 11.

The device use information management unit 12 is configured to collect the information varied depending on the use situation of the electronic device 1, and send a notification of the collected information to the content center 3. The network processing unit 13 is configured to receive a notification request from the device use information management unit 12 and send the notification to the content center 3 via the network 2 in response to the notification request, and configured to receive the content from the content center 3 via the network 2 and transfer the content to the distribution information reception unit 14. The distribution information reception unit 14 is configured to receive the content from the network processing unit 13 and transfer the content to the signage display control unit 15. The signage display control unit 15 is configured to display on the display unit 16 the content based on the primary advertisement information stored beforehand, and display the content received from the content center 3. The primary advertisement information is stored at the time of installation or updating of the program of the basic function unit 11. The display unit 16 is equivalent to a panel display unit in the case of the MFP or the printer. In the case of the projector, the display unit 16 is equivalent to a projection unit for projecting an image on a screen. In the case of the videoconference terminal, the display unit 16 is equivalent to an image output unit. In the case of the interactive whiteboard, the display unit 16 is equivalent to a display board unit.

Figure 5:
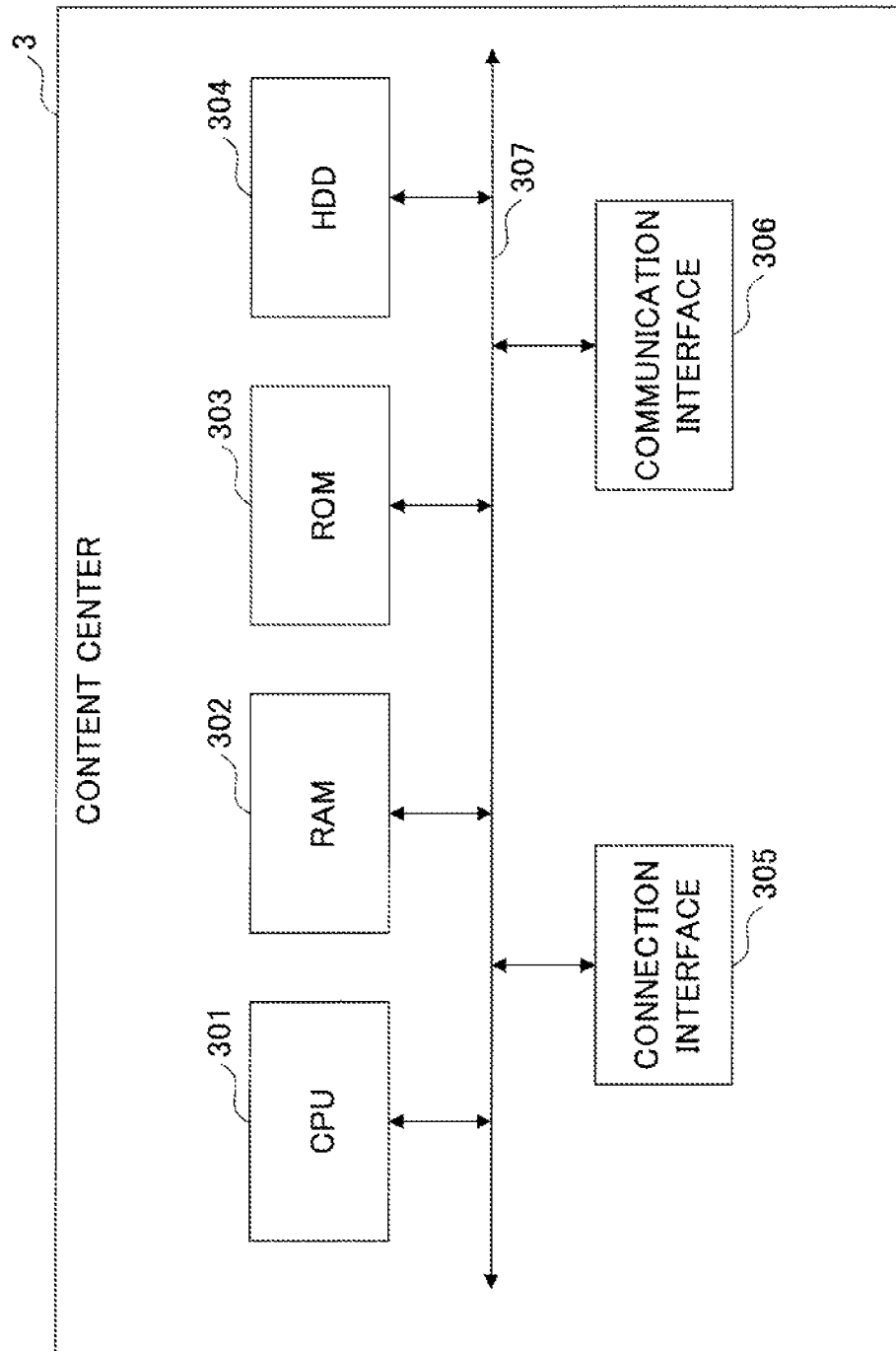
FIG. 5 is a diagram showing a hardware configuration of a content center in the information distribution system.

FIG. 5 shows a hardware configuration of the content center 3. As shown in FIG. 5, the content center 3 includes a CPU 301, a RAM 302, a ROM 303, a HDD 304, a connection interface 305, and a communication interface 306. These elements of the content center 3 are interconnected by a bus 307.

The CPU 301 executes a program read from the ROM 303 or the HDD 304 into the RAM 302 using the RAM 302 as a work area, to control overall operations of the content center 3. The connection interface 305 is an interface of the content center 3 for communicating with an external device connected to the content center 3. The communication interface 306 is an interface of the content center 3 for communicating with another information processing apparatus via the network 2 (FIG. 1).

Figure 6:
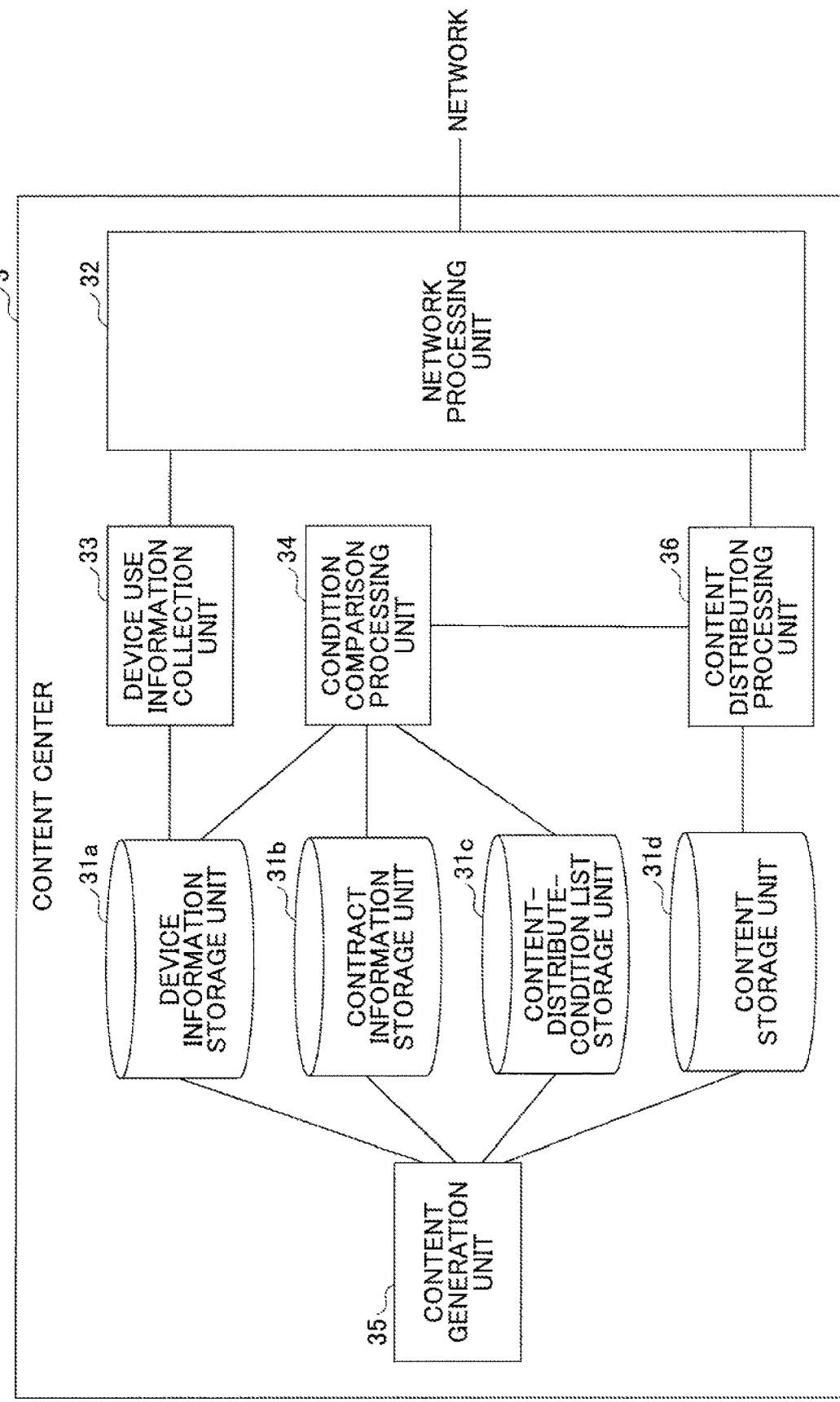
FIG. 6 is a diagram showing a software configuration of the content center.

FIG. 6 shows a software configuration of the content center 3. As shown in FIG. 6, the content center 3 includes a device information storage unit 31a, a contract information storage unit 31b, a content-distribute-condition list storage unit 31c, and a content storage unit 31d as data storage regions. Further, the content center 3 includes a network processing unit 32, a device use information collection unit 33, a condition comparison processing unit 34, a content generation unit 35, and a content distribution processing unit 36.

In the content center 3 shown in FIG. 6, the network processing unit 32, the device use information collection unit 33, the condition comparison processing unit 34, the content generation unit 35, and the content distribution processing unit 36 represent the functions and units implemented by any of the elements and devices shown in FIG. 5, which are activated by instructions from the CPU 301 based on the program read into the RAM 302 from the ROM 303 or the HDD 304.

The program may be recorded in an installable format or in an executable format on a computer-readable recording medium such as a CD, a DVD, an SD memory card, a USB memory, and a ROM. Alternatively, the program may be provided or distributed via a network, such as the Internet.

Further, in the content center 3 shown in FIG. 6, the device information storage unit 31a, the contract information storage unit 31b, the content-distribute-condition list storage unit 31c, and the content storage unit 31d may be implemented by one or more of the HDD 304, the ROM 303, and the RAM 302 which are shown in FIG. 5.

However, the present invention is not limited to this embodiment. For example, all or a part of the functions of the content center 3 may be implemented by dedicated hardware circuits.

The device information storage unit 31a is configured to store the latest device information for each of the device IDs of the plural electronic devices 1. The details of the device information will be described below. The contract information storage unit 31b is configured to store contract information for each of the device IDs of the plural electronic devices 1. The details of the contract information will be described below. The content-distribute-condition list storage unit 31c is configured to store a content-distribute-condition list including a set of content distribute conditions. The details of the content-distribute-condition list will be described below. The content storage unit 31d is configured to store the content to be distributed. The details of the content will be described below.

The network processing unit 32 is configured to receive a notification of the device use information from the network 2 and send the notification to the device use information collection unit 33, and configured to transmit a target content to the electronic device 1 of a target device ID in response to a request from the content distribution processing unit 36.

The device use information collection unit 33 is configured to store, in the device information storage unit 31a, the device information in which the device use information of the notification is incorporated based on the notification of the device use information received from the electronic device 1.

The condition comparison processing unit 34 is configured to send a distribution request to the content distribution processing unit 36 when a device ID conforming to the content distribute conditions of the content-distribute-condition list stored in the content-distribute-condition list storage unit 31c is found.

The content generation unit 35 is configured to generate content for each of the device IDs of the plural electronic devices 1 and store the content in the content storage unit 31d.

The content distribution processing unit 36 is configured to receive a distribution request and perform a process for distributing the target content stored in the content storage unit 31d. When the content to be distributed to a destination electronic device 1 does not exist in the content storage unit 31d (or when the content is not generated), the content distribution processing unit 36 does not distribute the content.

Figure 7:
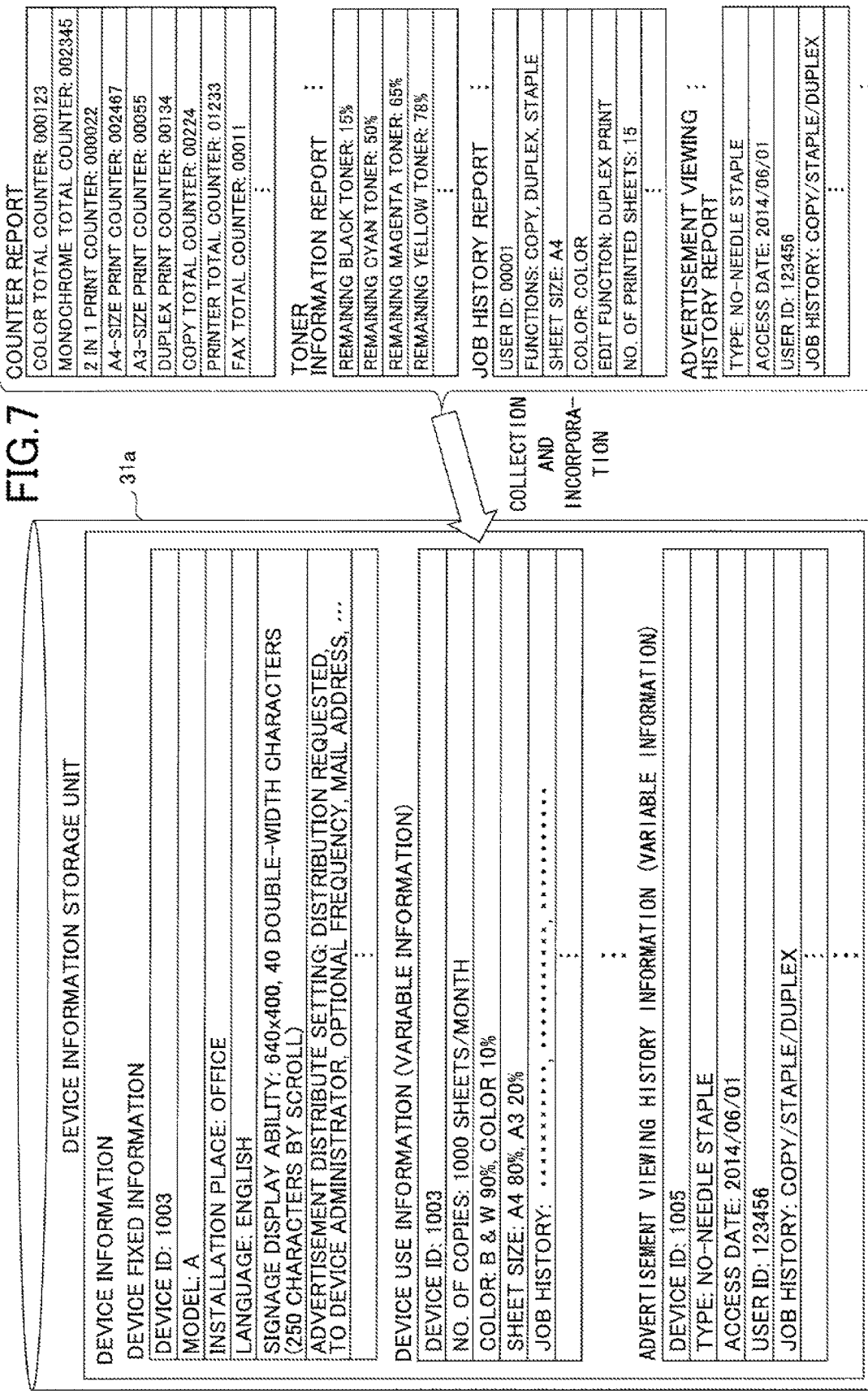
FIG. 7 is a diagram showing an example of a data structure of device information and various reports.

FIG. 7 shows an example of a data structure of device information and various reports. The device information stored in the device information storage unit 31*a* includes device fixed information, device use information (variable information), and advertisement viewing history information (variable information). The device fixed information includes a model, an installation place, a language, a signage display ability, an advertisement distribute setting (necessity of advertisement distribution, a distribution destination (distributed to the device or e-mail transmission), a frequency (arbitrary frequency, maximum frequency such as once per three days, etc.), and an address (mail address, IP address, etc.)), which are associated with a device ID. The device fixed information is set in the content center 3 at a time of device installation or reported to the content center 3 with a periodic notification with the variable information. The device use information includes the number of copied sheets, a color, a paper size, and a job history, which are associated with a device ID. The advertisement viewing history information includes an advertisement type, an access date, a user ID, and a job history (history of jobs performed during a login at a time of advertisement viewing and listening), which are associated with a device ID.

As shown in FIG. 7, a counter report, a toner information report, a job history report, and an advertisement viewing history report, which are sent from the electronic device 1 to the content center 3, are incorporated into the device use information. Each report may be stored as a part of the device use information as it is. In a case of the electronic device 1 under a maintenance contract or under a predetermined service provision, the device use information is periodically reported to the content center 3 and automatically totaled by the content center 3 on a month-by-month basis to generate management information. In a normal case, the management information is used for paper supply and billing purposes. In this embodiment, the management information is used for the purpose of further content distribution.

FIG. 8 shows an example of a data structure of contract information, a content-distribute-condition list, and content. Device contract information and user contract information are stored in the contract information storage unit 31*b*. The device contract information includes the setting (contracted or not) of each of a maintenance contract, a consumables automatic ordering option, a use situation report option, and an automatic counter reading, which are associated with a device ID. The user contract information includes a customer ID, one or more device IDs of electronic devices 1 owned by a user (customer) identified by the customer ID, and respective models of the electronic devices 1. A model is information for identifying the product itself or the functions of the product, such as a model number of the electronic device 1. These items are registered into the contract information storage unit 31*b* by a center operator at a time of device installation.

As shown in FIG. 8, the content-distribute-condition list stored in the content-distribute-condition list storage unit 31*c* includes content distribute conditions. For example, one of the content distribute conditions in connection with the use situation report is that if the use situation report option of the contract information is contracted and the device information is collected over a predetermined period, the use situation report will be distributed. In a service for providing the content of a secondary advertisement based on the advertisement viewing history of a primary advertisement in this embodiment, all or a part of the electronic devices 1 connected to the network 2 may be the target electronic device.

Further, an advertisement parameter is set for each of target units (in the example shown in FIG. 8, "no-needle staple") as one of content generation conditions corresponding to the content distribute conditions. A function availability list for determining whether a target electronic device supports a target unit, and a secondary advertisement pattern data for generating the content of a secondary advertisement are also stored in the content-distribute-condition list storage unit. In the function availability list, common function propriety information is registered for each of the target units. The common function propriety information is indicated by "O" (suitable) if the function (target unit) implemented in at least one of the plural electronic devices 1 installed in the same customer site does not become inconvenient. Otherwise, the common function propriety information is indicated by "x" (unsuitable).

The content stored in the content storage unit 31*d* includes a device ID and content data. The content data may be a content data body or a reference to the content data body, such as a URI (uniform resource identifier). The content data may include a display condition. For example, the display condition may specify displaying the content only when a user who logs in the electronic device 1 is an administrator. Further, the content may include an indication as to whether the distribution of the content is finished. With this indication, redundant distribution may be prevented. The content after distribution may be eliminated or transferred to another storage region.

FIG. 9 is a sequence diagram for explaining a process performed by the information distribution system according to the embodiment. In the process shown in FIG. 9, a user starts a function setting operation on the electronic device 1 after an end of the log-in process (the authentication process by the user authentication processing unit 17 shown in FIG. 4) (step S101). The basic function unit 11 of the electronic device 1 displays a function setting screen including an operation menu on the display unit 16 (the operation panel) (step S102). At this time, the basic function unit 11 incorporates a menu item for enabling the displaying of an advertisement of a non-implemented function into a usual operation menu according to the primary advertisement menu item information stored beforehand.

Figure 10:
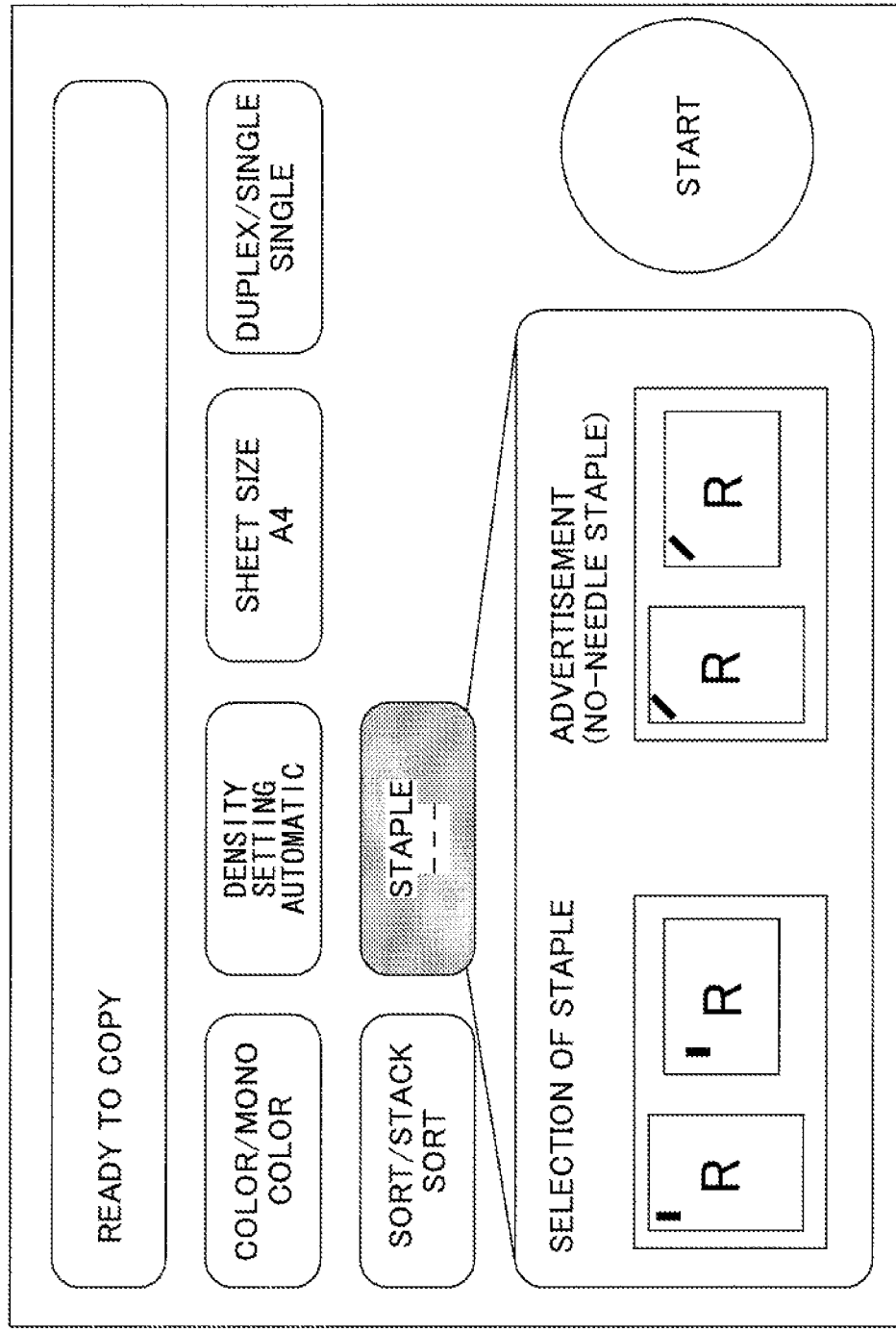
FIG. 10 is a diagram showing an example of a function setting screen.

FIG. 10 shows an example of a function setting screen of a copy function on an MFP. In the function setting screen shown in FIG. 10, a "staple" button is a button for calling a "staple selection" button and an "advertisement (no-needle staple)" button. When the "staple" button is selected by the user, the "staple selection" button and the "advertisement (no-needle staple)" button are displayed as low-rank menu items. Here, it is assumed that the "staple selection" function is already implemented in the electronic device 1, a "no-needle staple" function is not implemented, and the "advertisement (no-needle staple)" button is displayed for the purpose of advertisement.

Referring back to FIG. 9, the user selects an advertisement menu item (step S103). The signage display control unit 15 of the electronic device 1 displays the content of the primary advertisement associated with the menu item based on the primary advertisement information stored beforehand (step S104).

FIG. 11 shows an example of a primary advertisement screen. In the example shown in FIG. 11, a specific content of an advertisement of "no-needle staple" is illustrated. The primary advertisement screen includes an "inquiry" button, a "detail" (for movement to a HP) button, and a "purchase" button, in addition to an image of an advertisement content.

When the "inquiry" button is pressed, a mail transmission screen is displayed. A mail for requesting detailed information to an information processing apparatus having a mail address stored beforehand with the advertisement content is automatically generated. The transmission of the mail may be activated in the mail transmission screen. The mail is transmitted via the network 2 by using the communication interface 115 of the main unit 110 (FIG. 2) of the electronic device 1 and the inquiry can be easily sent.

When the "detail" (for movement to a HP) button is pressed, a web browser application which is stored in the ROM 122 or the flash memory 124 of the operation unit 120 (FIG. 2) of the electronic device 1 is initiated. The web browser application is configured to access a URL corresponding to the advertisement menu through the communication interface 115 of the main unit 110, and to display an advertisement page on the operation panel 127. In this manner, the user can receive the detailed information of the advertisement.

When the "purchase" button is pressed, the web browser application is initiated to access the corresponding URL, similar to the case in which the "detail" (for movement to a HP) button is pressed. The purchase of the unit advertised may be performed by the user from the web browser of the operation panel 127. The purchasing process which is similar to that of a general electronic commerce may be performed by using a well-known technique in the art.

In the present embodiment, the advertisement content with respect to a non-implemented function of the electronic device 1 is displayed. Alternatively, an advertisement content with respect to a function or performance which does not exist in the electronic device 1 may be displayed.

Referring back to FIG. 9, the user instructs a job execution (step S105). The electronic device 1 performs a job (step S106). The device use information management unit 12 stores the advertisement viewing history (step S107).

On the other hand, in order to acquire the advertisement viewing history, a service person instructs the electronic device 1 to output the advertisement viewing history in arbitrary timing (step S111). The output unit 19 (FIG. 4) of the electronic device 1 outputs the advertisement viewing history (step S112). In this case, the advertisement viewing history may be printed on a sheet (when the electronic device 1 is an MFP or a printer having the print function), or may be displayed on the operation panel, or the advertisement viewing history data may be output to a memory card.

FIG. 12A and FIG. 12B show examples of an advertisement viewing history which is output at step S112 in the process shown in FIG. 9. FIG. 12A shows an example of an advertisement viewing history per user. This advertisement viewing history includes a user name, an access date, an advertisement type, and a job history. The advertisement type indicates a type of an advertisement viewed or listened to by the user. The job history indicates one or more jobs performed on the access date (during a login period). For example, a first record of the example advertisement viewing history shown in FIG. 12A indicates that a user-A viewed or listened to an advertisement of a no-needle staple function on the access date while performing a copy job with duplex and needle staple options. FIG. 12B shows an example of an advertisement viewing history per advertisement type. This advertisement viewing history includes an advertisement type, a frequency, an access user, the number of times, and an access date.

Referring back to FIG. 9, the device use information management unit 12 (FIG. 4) of the electronic device 1 periodically transmits, to the content center 3 through the network processing unit 13 (FIG. 4), a device ID, a customer ID, a counter report, a toner report, a job history report, and an advertisement viewing history report (step S121). In this embodiment, the electronic device 1 transmits the IDs and the reports to the content center 3 autonomously. Alternatively, instead of the transmission of the IDs and the reports by the electronic device 1, the content center 3 may periodically perform polling to the electronic device 1 and, as a response to the polling the electronic device 1 may transmit the IDs and the reports to the content center 3. However, in the environment in which the electronic devices 1 are connected to an in-company local area network (LAN) and a firewall is incorporated in the LAN, accessing the resources of the network from the outside is strictly restricted in many cases. In such a case, it is more advantageous to use the autonomous transmission of the IDs and the reports to the content center 3 by the electronic device 1.

Upon reception of the counter report, the toner report, the job history report, and the advertisement viewing history report, the device use information collection unit 33 of the content center 3 incorporates the contents of the received reports into the device information of the device information storage unit 31a and stores the device information into the device information storage unit 31a (step S122).

Thereafter, the condition comparison processing unit 34 of the content center 3 makes a determination whether to distribute the content based on the respective content distribute conditions of the content-distribute-condition list stored in the content-distribute-condition list storage unit 31c (step S131). For example, regarding the use situation report, an electronic device having the use situation report option contracted is extracted based on the contract information stored in the contract information storage unit 31b, and the use situation report generated based on the device use information of the corresponding electronic device is distributed.

Regarding the content of the secondary advertisement based on the advertisement viewing history of the primary advertisement, the determination as to whether to distribute the content is made by the condition comparison processing unit 34 as follows. Namely, the condition comparison processing unit 34 makes reference to the device use information and the advertisement viewing history information of each device ID stored in the device information storage unit 31a, and determines whether the device use information and the advertisement viewing history information of each device ID conform with the advertisement parameter of the target unit of the secondary advertisement. For example, the advertisement parameter of the no-needle staple unit ("no-needle staple advertisement parameter" in FIG. 8) is read out from the content-distribute-condition list storage unit 31c. The advertisement viewing ratio (the number of viewers/the number of all users) is compared with 50%. The number of staple use jobs is compared with N times/month. The average number of stapled sheets is compared with 5. It is determined whether the device use information and the advertisement viewing history information of each device ID conform the the advertisement parameter of the target unit, based on the results of these comparisons. When the device use information and the advertisement viewing history information conform with the advertisement parameter, the content generation unit 35 generates the content of the secondary advertisement based on the secondary advertisement pattern data (FIG. 8) corresponding to the target unit.

A ratio of the number of viewers who viewed the advertisement (in this example, the advertisement of "no-needle staple unit") to the total number of all the users (the duplication of counting the identical user is avoided) is computed as an advertisement viewing ratio, and the advertisement viewing ratio represents the level of interest of the users. A ratio of the number of staple use jobs to the total number of all copy or print jobs (computed based on the job history report) is computed as a ratio of staple use jobs (or a usage ratio of components or functions related to the no-needle staple), and the ratio of staple use jobs is used for checking whether the frequency of staple use jobs is sufficiently high for the proposal of a staple function. Further, an average number of stapled sheets in staple use jobs is computed, and the average number of stapled sheets is used for checking whether the user's average number of stapled sheets exceeds the threshold.

Further, the condition comparison processing unit 34 reads the function availability list (FIG. 8) from the content-distribute-condition list storage unit 31*c* and determines whether the electronic device supports the target unit. For example, when the model of device ID "1003" is "A" (FIG. 7), it is determined that the model "A" supports the "no-needle staple unit" based on the function availability list (FIG. 8). When the electronic device model supports the target unit, a secondary advertisement for recommending the purchase of the target unit only may be generated. On the other hand, when the electronic device model does not support the target unit, a secondary advertisement for recommending the purchase of the target unit and another electronic device which supports the target unit may be generated.

When implementation of a corresponding function in at least one of the plural electronic devices 1 installed in the same customer site is sufficient and does not become inconvenient, the condition comparison processing unit 34 may take into consideration the models of the electronic devices installed by making reference to the user contract information of the customer site (FIG. 8). All the models of the electronic devices 1 in the customer site may be monitored by the condition comparison processing unit 34 based on the user contract information in FIG. 8. Further, the common function propriety information of the target unit which is the target unit advertised in the primary advertisement may be read from the function availability list in FIG. 8. When the target unit is indicated by "O" in the common function propriety information and the target unit of the primary advertisement is supported by at least one of the electronic devices 1 in the customer site, the condition comparison processing unit 34 determines that the secondary advertisement of the target unit can be generated, even if the model of the electronic device 1 used by the user does not support the target unit. In this case, the content center 3 is capable of providing the secondary advertisement if the customer owns at least one of the electronic devices 1 supporting the target unit.

Regarding the target unit, an unpurchased target unit is selected based on the user's purchase performance. By incorporating the information of purchased units into the device fixed information (FIG. 7), the determination may be made based on this information.

Further, when the advertisement parameter of the target unit is met, the condition comparison processing unit 34 transmits a content generation request to the content generation unit 35 together with the information indicating whether the target electronic device supports the function (step S132).

Upon reception of the content generation request, the content generation unit 35 generates the content of the secondary advertisement based on the secondary advertisement pattern data (FIG. 8) corresponding to the target unit (which is the content customized for each user based on the advertisement viewing history of the primary advertisement) and stores the content of the secondary advertisement in the content storage unit 31*d* (step S133).

FIG. 13 shows an example of a secondary advertisement screen. In this secondary advertisement screen, the secondary advertisement is addressed to a user, such as an administrator authorized to purchase the target unit, and includes a statement indicating that the purchase is recommended, the details of the target unit, and purchase conditions. When the content of a secondary advertisement is generated, the contract information (FIG. 8) may be accessed and incorporated into the purchase conditions, such as a price.

After the content generation unit 35 transmits an end of generation of the content to the condition comparison processing unit 34 (step S134), the condition comparison processing unit 34 sends a content distribution request to the content distribution processing unit 36 (step S135).

Upon reception of the content distribution request, the content distribution processing unit 36 of the content center 3 extracts the corresponding content from the content storage unit 31*d* and transmits the content data to the electronic device 1 which is indicated by the device ID (step S136).

After the content data is received, by using the distribution information reception unit 14 and the signage display control unit 15, the electronic device 1 stores the received content data internally, and displays the content on the display unit 16 (FIG. 4) in predetermined timing (step S137). Namely, the signage display control unit 15 selects the internally stored content data according to a predetermined user operation or the state of the electronic device 1 and displays the content data on the display unit 16. For example, the content data may be displayed on the display unit 16 when an administrator as a recipient of the secondary advertisement performs a login operation.

Further, in addition to or instead of the transmission of the content data at step S136, the content distribution processing unit 36 of the content center 3 may transmit the content data to the administrator by e-mail or the like (step S138). It is determined whether the content data is to be transmitted by e-mail based on the advertisement distribute setting (FIG. 7) of the device fixed information, and the mail address of the administrator is also determined based on the advertisement distribute setting (FIG. 7) of the device fixed information. Particularly when the target electronic device 1 is in an offline state and the device use information has been collected in the offline state, the transmission of the content data by e-mail is effective. Even when the electronic device 1 is in an online state, there may be a case where the display of the secondary advertisement on the electronic device 1 becomes obstructive to the business operations. Also in such a case, the transmission of the content data by e-mail is effective. Further, the distribution of an advertisement to the administrator of the electronic device by e-mail is effective measures for calling attention to the advertisement. When the distribution of the advertisement is not desired, the distribution of a secondary advertisement may be stopped by changing the advertisement distribute setting in the electronic device 1. It is also possible to change the distribution destination and the distribution frequency.

In the above-described process, after the condition comparison processing unit 34 determines that the content is to be distributed, the content is generated in response to the request received from the condition comparison processing unit 34. Alternatively, the information distribution system may be configured so that, after the content is generated by the content generation unit 35, the determination whether to distribute the content may be made by the condition comparison processing unit 34.

As described in the foregoing, according to the present invention, it is possible to provide an information distribution system which is capable of acquiring information which contributes to generation of content aimed at a higher effect without causing a burden to a user.

The present invention is not limited to the above-described embodiments, and variations and modifications may be made without departing from the scope of the present invention. It is to be understood that the foregoing detailed description is exemplary and explanatory and is not restrictive of the invention, as claimed.

Moreover, the software configurations as shown in FIG. 4 and FIG. 6 are determined according to the major functions of the electronic device 1 and the content center 3 in order to facilitate understanding of the process performed by the electronic device 1 and the content center 3. However, the present invention is not limited to the above-described embodiments. The process performed by the electronic device 1 and the content center 3 may be divided into a greater number of processing units according to the details of the process. Further, one processing unit may be divided into two or more minor processing units.

There may be two or more content centers 3 in the information distribution system, and the functions of the content center 3 may be arranged on two or more server devices in a distributed manner. Moreover, one or more of the device information storage unit 31a, the contract information storage unit 31b, the content-distribute-condition list storage unit 31c, and the content storage units 31d included in the content center 3 may exist over the network.

The selection of the advertisement menu item at step S103 in FIG. 9 is an example of "user operation on an electronic device". The primary advertisement information in the signage display control unit 15 in FIG. 4 is an example of "primary advertisement information stored beforehand in the electronic device". The display unit 16 in FIG. 4 is an example of "display unit". The device use information management unit 12 in FIG. 4 is an example of "device use information management unit". The access date in FIG. 12A and FIG. 12B is an example of "display date information". The output unit 19 in FIG. 4 is an example of "output unit". The user authentication processing unit 17 in FIG. 4 is an example of "user authentication unit". The user who performs a login operation upon starting the electronic device 1, authenticated by the user authentication processing unit 17 in FIG. 4 is an example of "operator". The "user" and the "access user" in FIG. 12A and FIG. 12B are examples of "user information". The "advertisement (no-needle staple)" in FIG. 10 is an example of "advertisement menu item".

The content center 3 in FIG. 6 is an example of "information distribution apparatus". The device use information collection unit 33 in FIG. 6 is an example of "device use information collection unit". The content generation unit 35 in FIG. 6 is an example of "distribution information generation unit". The content distribution processing unit 36 in FIG. 6 is an example of "distribution unit". The content distribution processing unit 36 in FIG. 6 is an example of "transmission unit".

The contract information storage unit 31b is an example of "user device contract information storage unit". The content-distribute-condition list storage unit 31c is an example of "storage unit". The number of staple use jobs or the average number of stapled sheets in the content-distribute-condition list storage unit 31c is an example of "usage count". The common function propriety information in the content-distribute-condition list storage unit 31c is an example of "common function propriety information". The no-needle staple advertisement parameter in the content-distribute-condition list storage unit 31c is an example of "criterion".

The target unit or the unit is an example of "component", and the "staple selection" button and the "advertisement (no-needle staple)" button shown in FIG. 10 are examples of "activation component". The function availability list of the content-distribute-condition list storage unit 31c is an example of "function availability information". The device use information collection unit 33 is an example of "advertisement viewing history collection unit". The information distribution system shown in FIG. 1 is an example of "information distribution system", and the process of distributing the content data shown in FIG. 9 is an example of "information distribution method". The device information storage unit 31a in FIG. 7 is an example of "device information storage unit". The device use information management unit 12 is an example of "advertisement viewing history management unit".

What is claimed is:

1. An information distribution system comprising an electronic device and an information distribution apparatus which are connected via a network, wherein
the electronic device includes a display, a first processor and a non-transitory medium storing one or more programs of instructions executable by the first processor to configure the display of the electronic device to display a function setting screen that accepts user operation to cause the electronic device to perform a specified function amongst plural functions provided by respective applications of the electronic device, and to configure the electronic device to perform a method comprising:
(a1) registering in the electronic device primary content information to be displayed on a primary content screen of the display of the electronic device, causing the function setting screen to be displayed on the display and accepting a user operation on the function setting screen;
(a2) causing the primary content screen to display the primary content information which is associated with a function provided by an application of the electronic device, the function not being implemented by the electronic device, the primary content screen being displayed in response to the user operation accepted in (a1); and
(a3) transmitting, to the information distribution apparatus, content viewing history information for identifying the primary content information displayed on the primary content screen in (a2), and
the information distribution apparatus includes a device information storage device, a second processor and a non-transitory medium storing one or more programs of instructions executable by the second processor to configure the information distribution apparatus to perform a method comprising:
(b1) receiving the content viewing history information transmitted by the electronic device in (a3);
(b2) registering in the device information storage device the content viewing history information received from the electronic device in (b1), and registering in the information distribution apparatus one or more target functions of the electronic device;

(b3) determining whether a target function, amongst the one or more target functions registered in the device information storage device in (b2) and corresponding to the function associated with the primary content information which is not implemented by electronic device, is capable of being performed by the electronic device, and upon determining that the target function is capable of being performed by the electronic device, generating secondary content distribution information which is associated with the target function, based on the content viewing history information identifying the primary content information associated with the function which is not implemented by the electronic device; and (b4) transmitting the secondary content distribution information associated with the target function and generated in (b3) to the electronic device, to be displayed on a secondary content screen of the display of the electronic device.

2. The information distribution system according to claim 1, wherein the method performed by the first processor further includes authenticating a user based on a login operation performed by the user; and associating, when the primary content information is displayed in response to the user operation in (a2), user information of the authenticated user unit with the primary content information, and registering the user information as a part of the content viewing history information.

3. The information distribution system according to claim 1, wherein the method performed by the first processor further comprises displaying the primary content information in (a2) when a content menu item is selected from the function setting screen on the electronic device.

4. The information distribution system according to claim 1, wherein the method performed by the second processor further comprises registering, in the device information storage device, device use information including a use situation of the electronic device according to a user operation accepted by the function setting screen caused to be displayed in (a1); and generating the secondary content distribution information in (b3) based on the content viewing history information and the device use information.

5. The information distribution system according to claim 4, wherein the method performed by the second processor of the information distribution apparatus further comprises registering a criterion in a content distribute condition list storage device of the information distraction apparatus;

retrieving the criterion from the content distribute condition list storage device of the information distraction apparatus and using the criterion to determine whether the secondary content distribution information associated with the identified primary content information is to be generated; and generating, when it is determined that the content viewing history information and the device use information conform to the criterion associated with the identified primary content information included in the content viewing history information, the secondary content distribution information associated with the target function which corresponds to the function which is not implemented by electronic device and which is associated with the primary content information.

6. The information distribution system according to claim 5, wherein the criterion includes one of a threshold corresponding to a content viewing ratio which is a ratio of a number of viewers of the primary content information to a number of all users having used the electronic device, and a threshold corresponding to a usage ratio of functions provided by the respective applications of the electronic device related to the target function which corresponds to the function which is not implemented by electronic device and which is associated with the primary content information, and the content viewing ratio or the usage ratio is determined based on the content viewing history information and the device use information, and the secondary content distribution information is generated based on a result of comparison with the threshold corresponding to the content viewing ratio or the usage ratio.

7. The information distribution system according to claim 1, wherein (b3) of the method performed by the second processor of the information distribution apparatus further comprises:

registering in a content distribute condition list storage device function availability information of one or more functions provided by the respective applications and associated with the primary content information for each of one or more model numbers of corresponding electronic devices;

accessing the content distribute condition list storage device to retrieve from the content distribute condition list storage device the function availability information of the function specified by the content viewing history information received from the electronic device in (b1), generating, when the function availability information associated with a model number of the electronic device having displayed the primary content information indicates that the model number of the electronic device is capable of performing the function which is not implemented by the electronic device, the secondary content distribution information for recommending that only the target function corresponding to the function which is not implemented by the electronic device and is associated with the primary content information be obtained, and generating, when the function availability information indicates that the model number of the electronic device is not capable of performing the function which is not implemented by the electronic device, the secondary content distribution information for recommending that the target function corresponding to the function which is not implemented by the electronic device and is associated with the primary content information and another electronic device which is capable of performing the target function be obtained.

8. The information distribution system according to claim 7, wherein the information distribution apparatus includes a user device contract information storage device which registers identification information of electronic devices owned by a user in association with corresponding model numbers of the electronic devices, the function availability information includes common function propriety information associated with the identified primary content information, the common function propriety information indicating whether a corresponding function provided by an application of the electronic device is capable of being performed in at least one of one or more electronic devices installed in a same customer site, and when the common function propriety information is stored in the content distribute condition list storage device in association with the function associated with the primary content information received from the electronic device having been displayed on the primary content screen in (a2), and at least one of the model numbers of the electronic devices registered in the user device contract information storage device is capable of performing the function associated with the primary content information, the secondary content distribution information for recommending purchase of the target function corresponding to the function in the primary content information is generated.

9. The information distribution system according to claim 1, wherein the display of the electronic device is configured to display, in response to user operation, an activation component for receiving a selection of a specified function amongst the plural functions provided by the respective applications of the electronic device, and an activation component for triggering the primary content information which is associated with the target function and is not implemented in the electronic device.

10. An information distribution apparatus which is connected with an electronic device via a network, the electronic device including a display, a first processor and a non-transitory medium storing one or more programs of instructions executable by the first processor to configure the display of the electronic device to display a function setting screen that accepts user operation to cause the electronic device to perform a specified function amongst plural functions provided by respective applications of the electronic device, the information distribution apparatus including a device information storage device, a second processor and a non-transitory medium storing one or more programs of instructions executable by the second processor to configure the information distribution apparatus to perform a method comprising:

(a) receiving, from the electronic device content viewing history information, the content viewing history information identifying primary content information caused to be displayed on a primary content screen of the display of the electronic device in response to a user operation accepted by the function setting screen, the primary content information being associated with a function provided by an application of the electronic device, the function not being implemented by the electronic device;

(b) registering in the device information storage device the content viewing history information received from the electronic device in (a), and registering in the information distribution apparatus one or more target functions of the electronic device;

(c) determining whether a target function, amongst the one or more target functions registered in the device information storage device in (b) and corresponding to the function associated with the primary content information which is not implemented by electronic device, is capable of being performed by the electronic device, and upon determining that the target function is capable of being performed by the electronic device, generating secondary content distribution information based on the content viewing history information identifying the primary content information associated with the function which is not implemented by the electronic device; and (d) transmitting the secondary content distribution information associated with the target function and generated in (c) to the electronic device, to be displayed on a secondary content screen of the display of the electronic device.

11. An information distribution method performed by an information distribution system including an electronic device and an information distribution apparatus which are connected via a network, the electronic device including a display, a first processor and a non-transitory medium storing one or more programs of instructions executable by the first processor to configure the display of the electronic device to display a function setting screen that accepts user operation to cause the electronic device to perform a specified function amongst plural functions provided by respective applications of the electronic device and to configure the electronic device to perform each of the following (a1), (a2) and (a3), the information distribution apparatus including a device information storage device, a second processor and a non-transitory medium storing one or more programs of instructions executable by the second processor to configure the information distribution apparatus to perform each of the following (b1), (b2), (b3) and (b4), the information distribution method comprising:

(a1) registering in the electronic device primary content information to be displayed on a primary content screen of the display of the electronic device, causing the function setting screen to be displayed on the display and accepting a user operation on the function setting screen;

(a2) causing a primary content screen to display primary content information which is associated with a function provided by an application of the electronic device, the function not being implemented by the electronic device, the primary content screen being displayed in response to the user operation accepted in (a1);

(a3) transmitting to the information distribution apparatus, by the electronic device, content viewing history information for identifying the primary content information displayed on the primary content screen in (a2);

(b1) receiving the content viewing history information transmitted by the electronic device in (a3);

(b2) registering in the device information storage device by the information distribution apparatus, the content viewing history information received from the electronic device in (b1) and registering in the information distribution apparatus one or more target functions of the electronic device;

(b3) determining whether a target function, amongst the one or more target functions registered in the device information storage device in (b2) and registered in the device information storage device and corresponding to the function associated with the primary content information which is not implemented by electronic device, is capable of being performed by the electronic device, and upon determining that the target function is capable of being performed by the electronic device, generating by the information distribution apparatus a secondary content distribution information based on the content viewing history information identifying the primary content information associated with the function which is not implemented by the electronic device; and (b4) transmitting by the information distribution apparatus the secondary content distribution information associated with the target function and generated in (b3) to the electronic device, to be displayed on the secondary content screen of the display of the electronic device.

12. The information distribution system according to claim 1, wherein
the electronic device is an image forming apparatus,
the image forming apparatus comprises:
a scanner or a printer and first circuitry configured to control operation of the scanner or the printer; and
an operation panel to display the function setting screen and the primary content screen, and second circuitry configured to control operation of the operation panel,
the method performed by the first processor further includes:
displaying, within the function setting screen displayed on the operation panel, an operation menu including a first menu item for performing an implemented function of the image forming apparatus and a second menu item for enabling displaying, on the primary content screen displayed on the operation panel, an advertisement of a non-implemented function of the image forming apparatus as the primary content information;
when the first menu item in the displayed operation menu is selected to request performing of the implemented function of the image forming apparatus, causing the first circuitry to perform an image forming function using the scanner or the printer; and
when the second menu item in the displayed operation menu is selected to request displaying of the advertisement of the non-implemented function of the image forming apparatus, causing the second circuitry to display on the operation panel the primary content screen including the advertisement of the non-implemented function of the image forming apparatus as the primary content information.

* * * * *